(12) United States Patent
Hu et al.

(10) Patent No.: US 12,262,244 B2
(45) Date of Patent: Mar. 25, 2025

(54) METHOD AND APPARATUS FOR QoS MONITORING AND FEEDBACK

(71) Applicant: LENOVO (BEIJING) LIMITED, Beijing (CN)

(72) Inventors: Jie Hu, Beijing (CN); Jing Han, Beijing (CN); Haiming Wang, Beijing (CN); Lianhai Wu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 243 days.

(21) Appl. No.: 17/278,947

(22) PCT Filed: Dec. 18, 2018

(86) PCT No.: PCT/CN2018/121830
§ 371 (c)(1),
(2) Date: Mar. 23, 2021

(87) PCT Pub. No.: WO2020/124381
PCT Pub. Date: Jun. 25, 2020

(65) Prior Publication Data
US 2022/0038943 A1     Feb. 3, 2022

(51) Int. Cl.
*H04W 28/02*   (2009.01)
(52) U.S. Cl.
CPC .................. *H04W 28/0268* (2013.01)
(58) Field of Classification Search
None
See application file for complete search history.

(56) References Cited

U.S. PATENT DOCUMENTS

| 2005/0152397 | A1* | 7/2005 | Bai | ............... H04N 21/6373 370/395.2 |
| 2009/0088170 | A1  | 4/2009 | Aaron | |

(Continued)

FOREIGN PATENT DOCUMENTS

| CN | 102195892 A | 9/2011 |
| EP | 2187563 A1 | 5/2010 |
| WO | WO2018228326 | * 11/2018 |

OTHER PUBLICATIONS

Huawei, Hisilicon, QoS support for NR V2X, 3GPP TSG-RAN WG2 Meeting #103-Bis, R2-1813935, Oct. 8-12, 2018, pp. 1-5, Chengdu, China.

(Continued)

*Primary Examiner* — Andre Tacdiran
(74) *Attorney, Agent, or Firm* — Kunzler Bean & Adamson

(57) ABSTRACT

The present disclosure relates to methods and apparatuses for QoS monitoring and feedback. According to an embodiment of the present disclosure, a method can include: receiving, at a user equipment, at least one QoS flow; monitoring, at the user equipment, at least one QoS parameter of the at least one QoS flow, wherein the at least one QoS parameter is configured by QoS monitoring configuration information; and transmitting, from the user equipment, a feedback report based on the monitored QoS parameter and the QoS monitoring configuration information. Embodiments of the present disclosure propose a novel QoS monitoring and feedback procedure, which can meet the advanced V2X service requirements.

19 Claims, 14 Drawing Sheets

(56) References Cited

U.S. PATENT DOCUMENTS

| | | | |
|---|---|---|---|
| 2012/0198081 A1* | 8/2012 | Zhao | H04L 47/765 709/227 |
| 2013/0273878 A1* | 10/2013 | Heo | H04L 5/0064 455/437 |
| 2017/0054622 A1* | 2/2017 | Mishra | H04W 12/088 |
| 2017/0230269 A1 | 8/2017 | Kamath et al. | |
| 2017/0332282 A1* | 11/2017 | Dao | H04L 1/0002 |
| 2018/0091968 A1* | 3/2018 | Ly | H04W 36/0088 |
| 2018/0317273 A1* | 11/2018 | Kim | H04W 76/22 |
| 2020/0120538 A1* | 4/2020 | Han | H04L 45/24 |
| 2020/0163005 A1* | 5/2020 | Rao | H04W 4/44 |
| 2020/0169913 A1* | 5/2020 | Byun | H04W 76/15 |
| 2021/0058827 A1* | 2/2021 | Holmström | H04W 28/0263 |
| 2021/0144579 A1* | 5/2021 | Ke | H04W 76/12 |
| 2021/0385685 A1* | 12/2021 | Khoryaev | H04W 28/0273 |

OTHER PUBLICATIONS

Huawei, Hisilicon, QoS Feedback of NR Sidelink V2X Communications, 3GPP TSG-RAN WG2 Meeting #104, R2-1818203, Nov. 12-16, 2018, pp. 1-3, Spokane, USA.

International Searching Authority, "Notification of Transmittal of the International Search Report and the Written Opinion of the International Searching Authority, or the Declaration", PCT/CN2018/121830, Dec. 18, 2018, pp. 1-6.

* cited by examiner

METHOD AND APPARATUS FOR QoS MONITORING AND FEEDBACK

TECHNICAL FIELD

The present application is related to wireless communication technology, and more particularly, related to QoS (Quality of Service) monitoring and feedback in V2X communication.

BACKGROUND

To expand the 3GPP (3rd Generation Partnership Project) platform to the automotive industry, the initial standard on support of V2V (vehicle to vehicle) services was completed in September 2016. Enhancements focusing on additional V2X (vehicle to everything) operation scenarios leveraging the cellular infrastructure, were completed in March 2017 as 3GPP V2X phase 1 for inclusion in Rel-14 LTE (Long Term Evolution).

3GPP V2X phase 2 in Rel-15 LTE introduces a number of new features in sidelink, including: carrier aggregation, high order modulation, latency reduction, and feasibility study on both transmission diversity and short TTI (Transmission Time Interval) on sidelink. All these new features in 3GPP V2X phase 2 are based on LTE and require co-existing with Rel-14 UE (user equipment) in the same resource pool.

3GPP V2X phase 3 in NR (New radio) identifies 25 use cases for advanced V2X services, which are categorized into four use case groups: vehicles platooning, extended sensors, advanced driving and remote driving. Detailed description of each use case group is provided as below.

Vehicles Platooning enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.

Extended Sensors enables the exchange of raw or processed data gathered through local sensors or live video images among vehicles, road site units, devices of pedestrian and V2X application servers. Vehicles can increase the perception of their environment beyond of what their own sensors can detect and have a more broad and holistic view of the local situation. High data rate is one of its key characteristics.

Advanced Driving enables semi-automated or full-automated driving. Each vehicle shares its own perception data obtained from its local sensors with vehicles in proximity. That allows vehicles to synchronize and coordinate their trajectories or manoeuvres. Each vehicle shares its driving intention with vehicles in proximity.

Remote Driving enables a remote driver or a V2X application to operate a remote vehicle for those passengers which cannot drive by themselves or remote vehicles located in dangerous environments. For a case that variation is limited and routes are predictable, such as public transportation, driving based on cloud computing can be used. High reliability and low latency are the main requirements of the Remote Driving.

Since the advanced V2X services have more variable and strict QoS requirements than the services requirements in Rel-14 and Rel-15 LTE V2X, it is important for the network to know whether the QoS of the corresponding V2X service is met and then to adjust the related configuration and/or parameters according to the QoS feedback. Accordingly, the industry desires an improved QoS monitoring and feedback mechanism to meet the advanced V2X service requirements.

SUMMARY OF THE APPLICATION

One object of the present application is to provide a technical solution for QoS monitoring and feedback in V2X communication, especially between V2X UEs and between at least one V2X UE and a base station, which can meet the strict QoS requirement in the advanced V2X services.

According to an embodiment of the present application, a method may include: receiving, at a user equipment, at least one QoS flow; monitoring, at the user equipment, at least one QoS parameter of the at least one QoS flow, wherein the at least one QoS parameter is configured by QoS monitoring configuration information; and transmitting, from the user equipment, a feedback report based on the monitored QoS parameter and the QoS monitoring configuration information.

In an embodiment of the present application, the QoS monitoring configuration information may include at least one of QoS parameter information and QoS monitoring policy information. The feedback report may include at least one of: identity of the user equipment, session identity, QoS flow identity, and monitored result of the at least one QoS parameter.

According to another embodiment of the present application, a method may include: transmitting, from a first user equipment, at least one QoS flow to a second user equipment; and receiving, from the second user equipment, a feedback report of at least one QoS parameter for the at least one QoS flow.

In yet another embodiment of the present application, the method may include: receiving a notification for QoS flow modification in the application layer of the first user equipment in the case that the feedback report indicates that QoS requirement for the at least one QoS flow cannot be met or can be increased to a level higher than current one.

According to yet another embodiment of the present application, a method may include: transmitting QoS monitoring configuration information; receiving a feedback report of at least one QoS parameter for at least one QoS flow; and in the case that the feedback report indicates that QoS requirement for the at least one QoS flow cannot be met or can be increased to a level higher than current one, performing at least one of the following actions: transmitting, to a first user equipment, an indication for transmitting a notification for QoS flow modification to the application layer of the first user equipment; and transmitting, to a first user equipment, configuration information indicating an updated scheduling resource for the at least one QoS flow.

An embodiment of the present application also provide an apparatus, including: at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement a method according to an embodiment of the present application with the at least one receiver, the at least one transmitter and the at least one processor.

Embodiments of the present application provide a technical solution for QoS monitoring and feedback in NR V2X transmission. Accordingly, embodiments of the present application will facilitate the application of the NR V2X communication.

BRIEF DESCRIPTION OF THE DRAWINGS

In order to describe the manner in which advantages and features of the application can be obtained, a description of the application is rendered by reference to specific embodiments thereof which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

There are various communication scenarios in a V2X communication network. However, the communication between two V2X UEs can be generalized into four scenarios according to the relationship with the network side as shown in FIGS. 1A-1D.

Figure 1A:
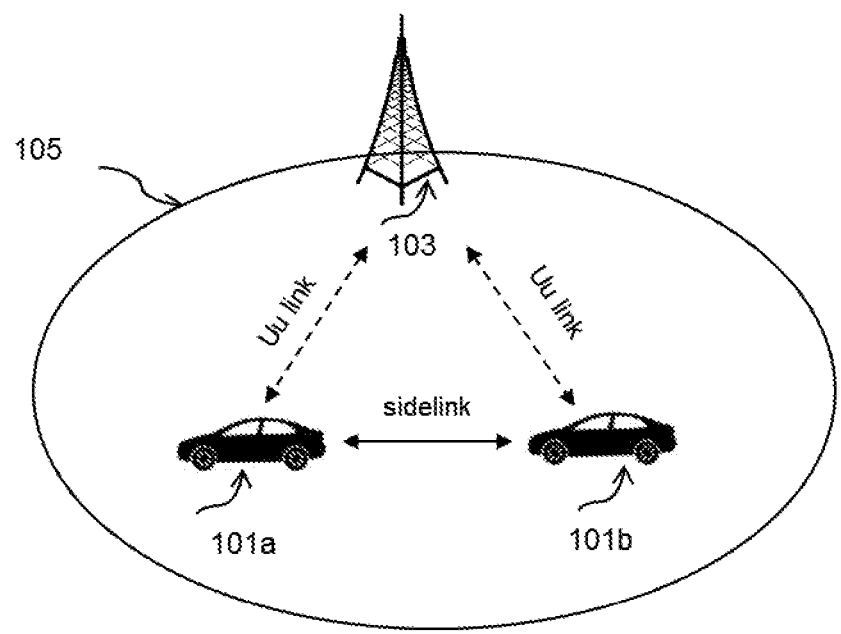
FIG. 1A is a schematic view of a V2X communication scenario according to an embodiment of the present application.

FIG. 1A is a schematic view of a V2X communication scenario according to an embodiment of the present application.

As shown in FIG. 1A, the V2X communication scenario may include a plurality of UEs 101, such as first UE 101a and second UE 101b, and a base station 103. The wording "the first" and "the second" . . . are only used to clearly illustrate the embodiments of the present application, but not be used to limit the substance of the present application. Although only two UEs 101 and one base station 103 are shown for illustrating the embodiment of the present application in a simplified manner, persons skilled in the art should understand there can be more base stations 103 and more UEs 101 in and outside of the coverage of the base stations 103 (hereafter, it is the same). The UEs 101 and base station 103 may support communication based on the 3G, long-term evolution (LTE), LTE-Advanced (LTE-A), 4G, new radio (NR), or other suitable standards. In addition, the first UE 101a and the second UE 101b may be V2X UEs, for example, vehicles. The base station 103 may be a gNB. Persons skilled in the art should understand that as the 3GPP (3rd Generation Partnership Project) and related communication technology develop, the terminologies recited in the specification may change, which should not affect the principle of the application.

The base station 103 may define one or more cells, and each cell may have a coverage area 105. In this scenario, both the first UE 101a and second UE 101b are within the coverage of the base station 103, which is not a specific base station 103 shown in FIG. 1A and can be any one of the base stations 103 in a V2X communication system. For example, in the case that a V2X communication scenario includes two base stations 103 with a UE 101 being within the coverage of any one the two base stations 103 means that the UE 101 is within the coverage of a base station 103 in the V2X communication system; and on a contrary with a UE 101 being outside of the coverage of both base stations 103 means that the UE 101 is out the coverage of a base station 103 in the V2X communication system.

The first UE 101a and the second UE 101b may exchange V2X messages with the base station 103 via, for example, a Uu link, and exchange V2X messages between each other through a sidelink, for example, a PC5 interface as defined in TS 23.303. During the communication between two UEs 101, one UE 101 may act as a transmitter, i.e., a transmitter UE (hereinafter referred to as "Tx UE"), and the other UE 101 may act as a receiver, i.e., a receiver UE (hereinafter referred to as "Rx UE"). The Tx UE, for example the first UE 101a, may initiate a unicast transmission to the Rx UE, for example 101b, and the Rx UE 101b may receive the unicast transmission from the Tx UE, for example the first UE 101a.

Figure 1B:
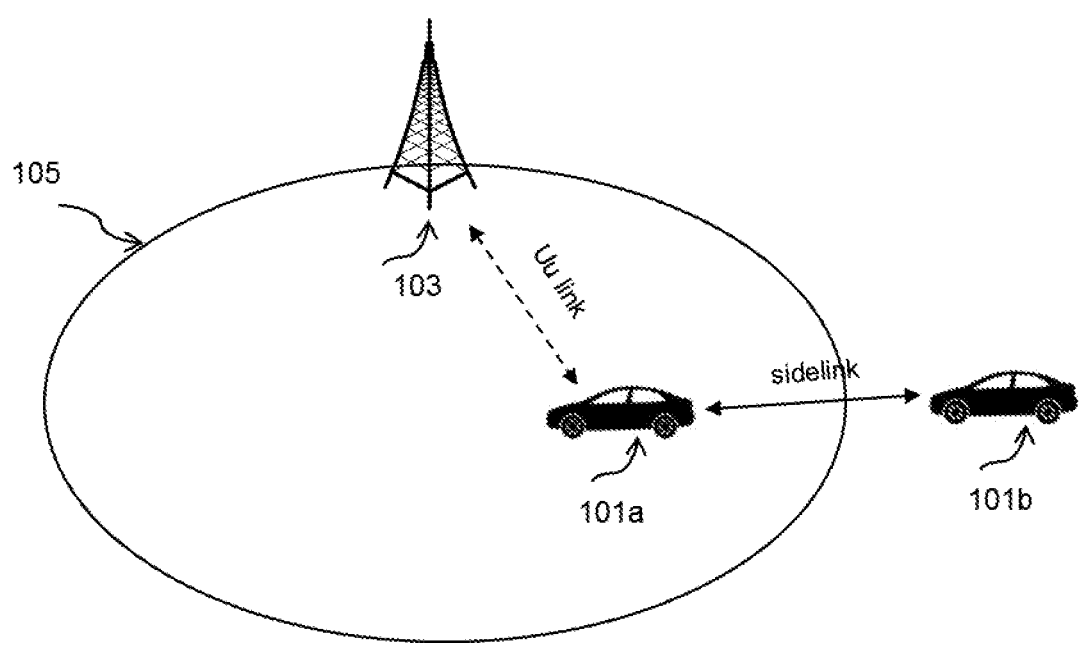
FIG. 1B is a schematic view of a V2X communication scenario according to another embodiment of the present application.

FIG. 1B is a schematic view of a V2X communication scenario according to another embodiment of the present application.

As shown in FIG. 1B, the V2X communication scenario may include a plurality of UEs 101, such as a first UE 101a and a second UE 101b, and a base station 103. The above descriptions regarding the base station 103 and UEs 101 in FIG. 1A can also be applicable to the scenario in FIG. 1B except that the first UE 101a is within the coverage of the base station 103 and the second UE 101b is outside of the coverage of the base station 103. Similarly, the first UE 101*a* may exchange V2X messages with the base station 103 via Uu link, and exchange V2X messages with the second UE 101*b* through a sidelink, for example, PC5 interface as defined in TS 23.303. Since the second UE 101*b* is outside of the coverage range associated with the base station 103, it cannot exchange messages with the base station 103 via Uu link. During the communication between the two UEs 101, the first UE 101*a* may act as a Tx UE and initiate a unicast transmission, the second UE 101*b* may act as an Rx UE and receive the unicast transmission from the Tx UE, and vice versa.

Figure 1C:
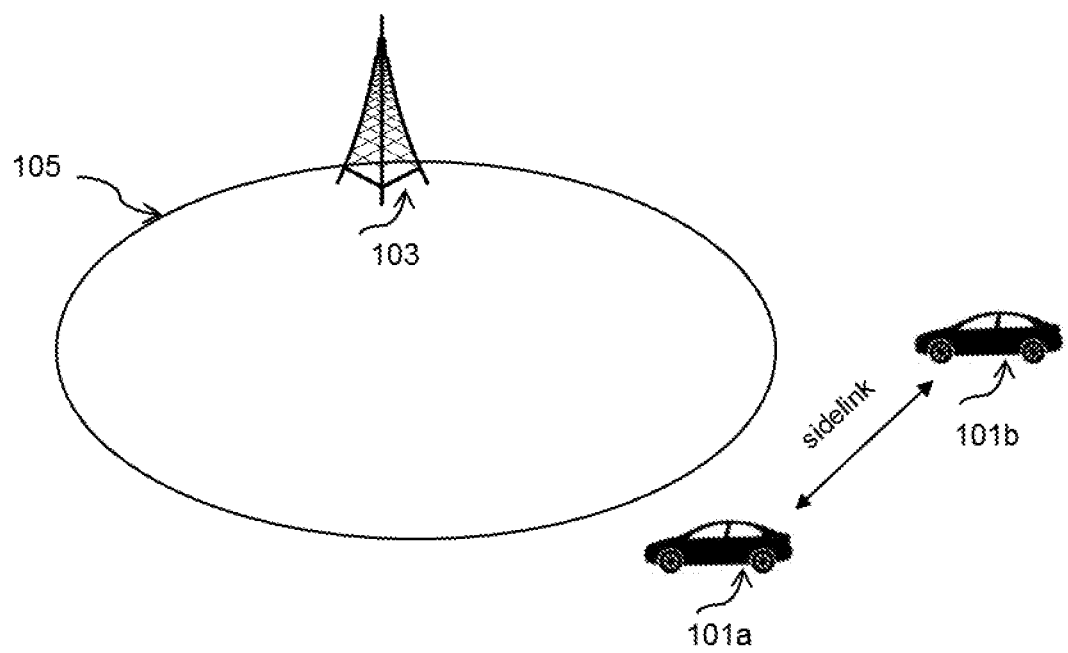
FIG. 1C is a schematic view of a V2X communication scenario according to yet another embodiment of the present application.

FIG. 1C is a schematic view of a V2X communication scenario according to yet another embodiment of the present application.

As shown in FIG. 1C, the V2X communication scenario may include a plurality of UEs 101, such as a first UE 101*a* and a second UE 101*b*, and a base station 103. The above descriptions regarding the base station 103 and the UEs 101 in FIG. 1A can also be applicable to the scenario in FIG. 1C except that both the first UE 101*a* and the second UE 101*b* are outside of the coverage of the base station 103. Since the first UE 101*a* and the second UE 101*b* are outside of the coverage of the base station 103, they cannot exchange messages with the base station 103 via Uu link. However, the first UE 101*a* may exchange V2X messages with the second UE 101*b* through sidelink, for example, PC5 interface as defined in TS 23.303. During the communication between the two UEs 101, the first UE 101*a* may act as a Tx UE and initiate a unicast transmission, and the second UE 101*b* may act as an Rx UE and receive the unicast transmission from the Tx UE, and vice versa.

Figure 1D:
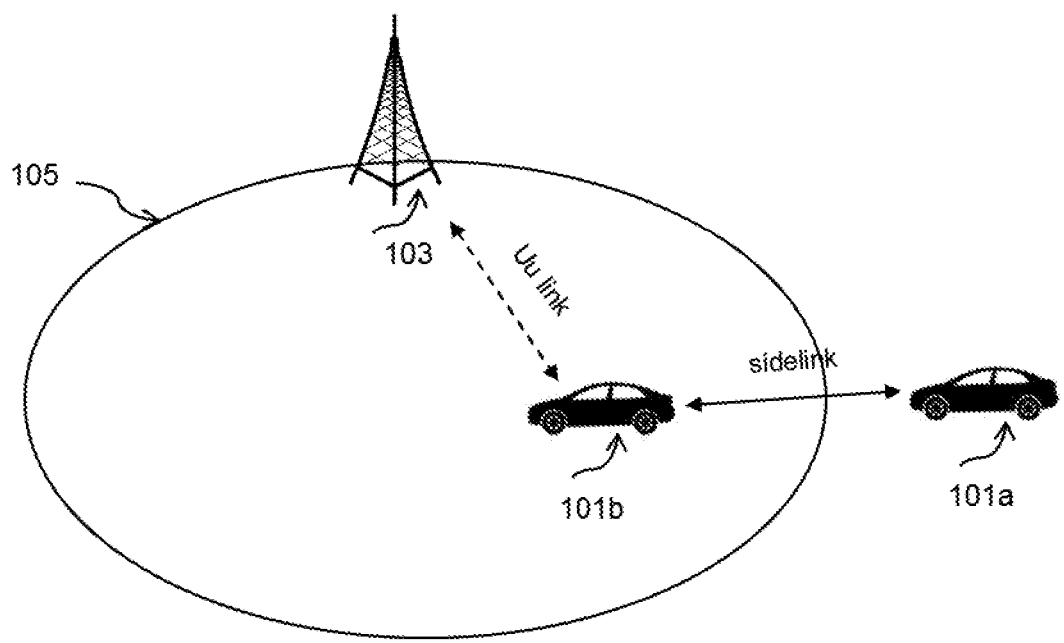
FIG. 1D is a schematic view of a V2X communication scenario according to yet another embodiment of the present application.

FIG. 1D is a schematic view of a V2X communication scenario according to yet another embodiment of the present application.

As shown in FIG. 1D, the V2X communication scenario may include a plurality of UEs 101, such as a first UE 101*a* and a second UE 101*b*, and a base station 103. The above descriptions regarding the base station 103 and the UEs 101 in FIG. 1A can also be applicable to the scenario in FIG. 1D except that the first UE 101*a* is outside of the coverage of the base station 103 and the second UE 101*b* is within the coverage of the base station 103. Similarly, since the first UE 101*a* is outside of the coverage of the base station 103, it cannot exchange messages with the base station 103 via Uu link. During the communication between the two UEs 101, the first UE 101*a* may act as a Tx UE and initiate a unicast transmission, and the second UE 101*b* may act as an Rx UE and receive the unicast transmission from the Tx UE, and vice versa.

Since V2X advanced service has stringent QoS requirements, e.g. the delay should be [3, 100] ms for V2V, the reliability should be [90%, 99.999%], and the data rate should reach up to 1 Gbps. However, such QoS requirements cannot be always guaranteed by the network because several factors such as wireless coverage, network node resources, and transport network may affect the E2E (end to end) QoS performance. For example, the latency and packet error rate may be increased due to the interference in a radio cell. Under such circumstances, it is critical to timely notify the above changes to at least one of the application and application server for adapting the dynamic network conditions.

In a legacy LTE V2X network, a UE 101 may report related information to the network side to improve performance, including: geography location information for assist the network to provide sidelink resources, sidelink UE information to request sidelink resources, UE assistance information for SPS (semi-persistent scheduling) configuration, and CBR (channel busy rate) information for transmission parameter adaptation and so on. However, the reported information cannot reflect the QoS information that the UE 101 is experiencing, especially the information such as latency and reliability. That is, there is no QoS related information monitoring and reporting mechanism for assisting the AS (Access Stratum) layer of a Tx UE and a base station 103 to decide whether the QoS requirements can be reached.

Embodiments of the present application at least propose a novel QoS monitoring and feedback procedure and apparatus, which can meet the advanced V2X service requirements. Specifically, embodiments of the present application propose a QoS monitoring and feedback mechanism for NR V2X to perform real-time and reliable QoS information interaction with the 5G core network. To meet stringent QoS requirements for V2X advanced services, schemes are designed so that the network will know whether the QoS of the corresponding V2X service is met and then to adjust at least one of related configurations and parameters according to the QoS feedback. In an example embodiment of the present application, in the case that the QoS requirement of a given application cannot be met or can be increased to a level higher than current one, the application layer of a Tx UE can correspondingly adjust the QoS requirement to a lower or higher level for supporting the V2X advanced services with required QoS. In another example embodiment of the present application, in the case that the QoS requirement of a given application cannot be met or can be increased to a level higher than current one, the base station may correspondingly transmit configuration information indicating an updated scheduling resource for the at least one QoS flow to meet the QoS requirement or increase the QoS requirement to a higher level.

More details on the embodiments of the present application will be illustrated in the following text in combination with the appended drawings.

Figure 2:
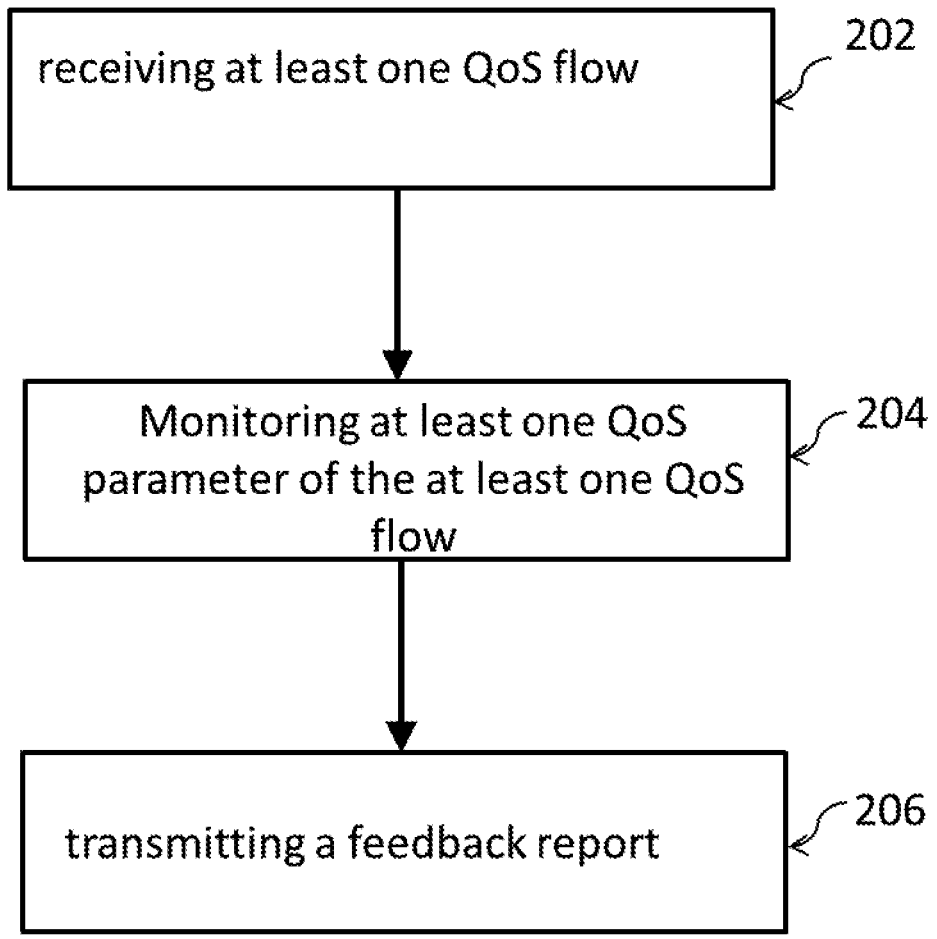
FIG. 2 is a flow chart illustrating a method for QoS monitoring and feedback in V2X communication according to an embodiment of the present application.

FIG. 2 is a flow chart illustrating a method for QoS monitoring and feedback in V2X communication according to an embodiment of the present application. The method may be performed by an apparatus, for example an Rx UE, which may receive a unicast transmission from a Tx UE. The Rx UE can be the second UE 101*b* and the TX UE can be the first UE 101*a* as illustrated in FIGS. 1A-1D, and vice versa.

For a V2X service, the Rx UE may establish one PDU (protocol data unit) session with the Tx UE. One PDU session may include at least one DRB (data radio bearer) and each DRB may include at least one QoS flow. As shown in FIG. 2, in step 202, the Rx UE, for example the second UE 101*b* may receive at least one QoS flow from a Tx UE, for example the first UE 101*a*. Each of the at least one QoS flow may have a corresponding QoS requirement. The QoS requirement can be generated in the application layer of the Tx UE, for example, a first UE 101*a* and may be reported to a base station 103.

In step 204, the Rx UE, for example the second UE 101*b* may monitor at least one QoS parameter of the at least one QoS flow. The at least one QoS parameter can be configured by QoS monitoring configuration information, which may be received from a base station 103, for example a gNB in an embodiment of the present application. In another embodiment of the present application, the QoS monitoring configuration information may be predefined in the Rx UE, for example in a SIM (Subscriber Identity Module) or USIM (Universal Subscriber Identity Module) in the Rx UE.

In an embodiment of the present application, in the case that the Rx UE is within the coverage of a base station 103, for example, as the second UE 101*b* in the scenario shown in FIGS. 1A and 1D, the Rx UE may receive the QoS monitoring configuration information and monitor the at least one QoS parameter of the QoS flow based on the QoS monitoring configuration information received from a base station 103. In the case that the Rx UE is outside of the coverage area of the base station 103, for example, as the second UE 101*b* in the scenario shown in FIGS. 1B and 1C, the Rx UE may monitor the at least one QoS parameter based on the QoS monitoring configuration information predefined in a SIM or USIM in the Rx UE. In the case that the Rx UE moves outside the coverage area of the base station 103, for example, as the second UE 101*b* moving from the scenario shown in FIGS. 1A and 1D to the scenario shown in FIGS. 1B and 1C, the Rx UE may pass over the QoS monitoring configuration information received from the base station 103 while monitor the at least one QoS parameter based on the QoS monitoring configuration information predefined in the SIM or USIM in the Rx UE.

The QoS monitoring configuration information may include at least one of QoS parameter information and QoS monitoring policy information. The QoS parameter information can include at least one of: data rate, end-to-end latency, and reliability. The reliability can be packet error rate. QoS parameter information and QoS monitoring policy information may be configured for monitoring a corresponding QoS flow. The QoS monitoring policy information may include at least one of: threshold for each QoS parameter and the corresponding action associated with the threshold, report trigger for transmitting the feedback report, and at least one monitoring packet and a sequence number of each monitoring packet. The report trigger for transmitting the feedback report may define the time to report the monitored result of the at least one QoS parameters and may include one of the following reporting manners: one-shot trigger, periodic trigger, and event trigger.

According to an embodiment of the present application, in the case, for example when the second UE 101*b* is within the coverage of the base station 103, the Rx UE may begin to monitor the at least one QoS parameter of the QoS flow after receiving the QoS monitoring configuration information from the base station 103. The Rx UE can keep monitoring the at least one QoS parameter. In another embodiment of the present application, the Rx UE may store the received QoS monitoring configuration information, while not monitoring the at least one QoS parameter until an indication from the base station 103 or from the Tx UE, for example the first UE 101*a*, is received.

According to another embodiment of the present application, in the case that the Rx UE, for example, the second UE 101*b* is outside of the coverage area of the base station 103 as shown in FIGS. 1B and 1C, the Rx UE may keep monitoring the at least one QoS parameter as predefined in the SIM or USIM in the Rx UE. In another embodiment of the present application, the Rx UE may begin to monitor the at least one QoS parameter at the time predefined in the SIM or USIM in the Rx UE. In yet another embodiment of the present application, the Rx UE may not monitor the at least one QoS parameter until receiving an indication from the Tx UE, for example the first UE 101*a*.

In step 206, the Rx UE, for example the second UE 101*b*, may transmit a feedback report based on the monitored QoS parameter and the QoS monitoring configuration information. For example, the feedback report may be transmitted to the base station 103, the Tx UE, for example the first UE 101*a*, or both the base station 103 and the Tx UE. The feedback report may include at least one of: identity of the Rx UE, session identity, QoS flow identity, and monitored result of the at least one QoS parameter. In one embodiment, the monitored result of the at least one QoS parameter may indicate the value of the at least one QoS parameter. In another embodiment, the monitored result of the at least one QoS parameter may indicate the difference between the at least one QoS parameter and the QoS requirement of the QoS flow.

The time to transmit the feedback report is based on the report trigger included in the QoS monitoring policy information. For example, in the case that the report trigger indicates a one-shot trigger, the Rx UE may transmit the QoS feedback report after receiving a QoS feedback indication for reporting the QoS feedback report from the base station 103 or the Tx UE. In an embodiment of the present application, in the case that the report trigger indicates a periodic trigger, the Rx UE may transmit the QoS feedback report periodically based on the period configured by the base station 103 or pre-defined in the SIM or USIM in the Rx UE. In the case that that the report trigger indicates an event trigger, the Rx UE may transmit the QoS feedback report after detecting that the difference between the monitored at least one QoS parameter and the corresponding QoS requirement exceeds a threshold provided in the QoS monitoring policy information during a time window. The time window may be configured by the base station 103 or pre-defined in the SIM or USIM in the Rx UE. For example, the Rx UE may find that the monitored at least one QoS parameter is worse than the corresponding QoS requirement. In the case that the difference between the monitored at least one QoS parameter and the corresponding QoS requirement exceeds a provided first threshold during a time window, the Rx may transmit the QoS feedback report. In another example of the present application, the Rx UE may find that the monitored at least one QoS parameter is better than the corresponding QoS requirement. Similarly, in the case that the difference between the monitored at least one QoS parameter and the corresponding QoS requirement exceeds a provided second threshold during a time window, the Rx may transmit the QoS feedback report. The first threshold and the second threshold provided in the QoS monitoring policy information may be the same or different.

The base station 103 or the Tx UE, which receives the QoS feedback from the Rx UE, may evaluate the feedback report, and may adjust at least one of the configuration information and schedule information related to QoS flows to match the QoS of V2X advanced services. Accordingly, after transmitting the feedback report, the Rx UE, for example the second UE 101*b*, may receive a new QoS flow different from the previous at least one QoS flow from the Tx UE. In another embodiment of the present application, a base station 103 may transmit the configuration information to the Tx UE, and the Rx UE may receive configuration information indicating an updated scheduling resource for the at least one QoS flow from the Tx UE. In yet another embodiment of the present application, the Rx UE may receive both the new QoS flow and the configuration information.

Figure 3:
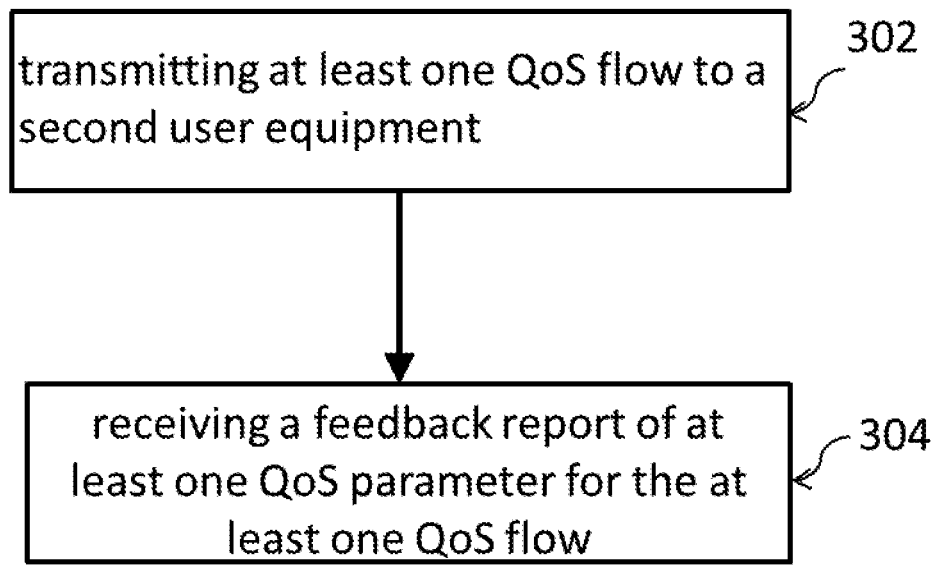
FIG. 3 is a flow chart illustrating a method for QoS monitoring and feedback in V2X communication according to another embodiment of the present application.

FIG. 3 is a flow chart illustrating a method for QoS monitoring and feedback in V2X communication according to another embodiment of the present application. The method may be performed by an apparatus for example a Tx UE as the first UE 101*a* in FIGS. 1A-1D, which may transmit the unicast transmission to an Rx UE, for example, the second UE 101b in FIGS. 1A-1D. Each of the Tx UE and the Rx UE may be a V2X UE, such as a vehicle.

For a V2X service, the Tx UE may establish one PDU session with the Rx UE. One PDU session may include at least one DRB and each DRB may include at least one QoS flow. Each of the at least one QoS flow may have a corresponding QoS requirement. As shown in FIG. 3, in step 302, the Tx UE, for example the first UE 101a, may transmit at least one QoS flow to a Rx UE, for example the second UE 101b.

After transmitting the at least one QoS flow, the Tx UE, for example the first UE 101a, may transmit an indication to the Rx UE, for example the second UE 101b, to activate monitoring at least one QoS parameter at the Rx UE. The at least one QoS parameter may include at least one of data rate, end-to-end latency, and reliability such as packet error rate. In step 304, the Tx UE may receive a feedback report of at least one QoS parameter for the at least one QoS flow from the Rx UE. For example, the feedback report may be received through the sidelink, in other words, PC5 interface between the first UE 101a and the second UE 101b. The feedback report may include at least one of: identity of the second UE, session identity, QoS flow identity, and monitored result of the at least one QoS parameter.

According to an embodiment of present application, the Tx UE, for example the first UE 101a may be an autonomous resource selection mode UE. That is, the Tx UE may autonomously select resource for sidelink transmission. For example, in the case that the Tx UE is outside of the coverage of the base station 103, for example, as the first UE 101a in FIGS. 1B and 1D, the Tx UE can operate in an autonomous resource selection mode. After receiving the feedback report from the Rx UE, for example the second UE 101b, the Tx UE may determine whether the QoS requirement for the at least one QoS flow can be met or can be increased to a level higher than the current one based on the feedback report. For example, in the case that the Tx UE determines that the difference between the monitored at least one QoS parameter and the corresponding QoS requirement exceeds a threshold provided in the QoS monitoring policy information, the Tx UE may determine that the QoS requirement for the at least one QoS flow cannot be met or can be increased. In the case that the feedback report indicates that the QoS requirement for the at least one QoS flow cannot be met or can be increased to a level higher than the current one, the AS layer of the Tx UE may transmit a notification for QoS flow modification to the application layer of the Tx UE. After receiving the notification, the application layer of the Tx UE may modify QoS flows to be different from the previous so that the QoS requirement can be met or be increased to a level higher than the current one. The Tx UE may transmit the new QoS flow to the Rx UE.

According to another embodiment of present application, the Tx UE, for example the first UE 101a may be a network schedule mode UE. That is, the resource for sidelink transmission between the Tx UE and the Rx UE is configured by the base station 103. In the case that the Tx UE is within the coverage of the base station 103, for example as the first UE 101a in FIGS. 1A and 1B, the Tx UE can operate in a network schedule mode. After receiving the feedback report from the Rx UE, for example the second UE 101b, the Tx UE may transmit the feedback report to the base station 103. The base station 103 may evaluate the feedback report. In the case that the feedback report indicates that QoS requirement for the at least one QoS flow cannot be met or can be increased to a level higher than current one, the Tx UE may receive an indication from the base station 103 to transmit a notification for QoS flow modification to the application layer of the Tx UE. Accordingly, the AS layer of the Tx UE may transmit a notification for QoS flow modification to the application layer of the Tx UE. After receiving the notification, the application layer of the Tx UE may modify the QoS flow to be different from the previous so that the QoS requirement can be met or can be increased to a level higher than the current one. The Tx UE may transmit the new QoS flow to the Rx UE.

Figure 4:
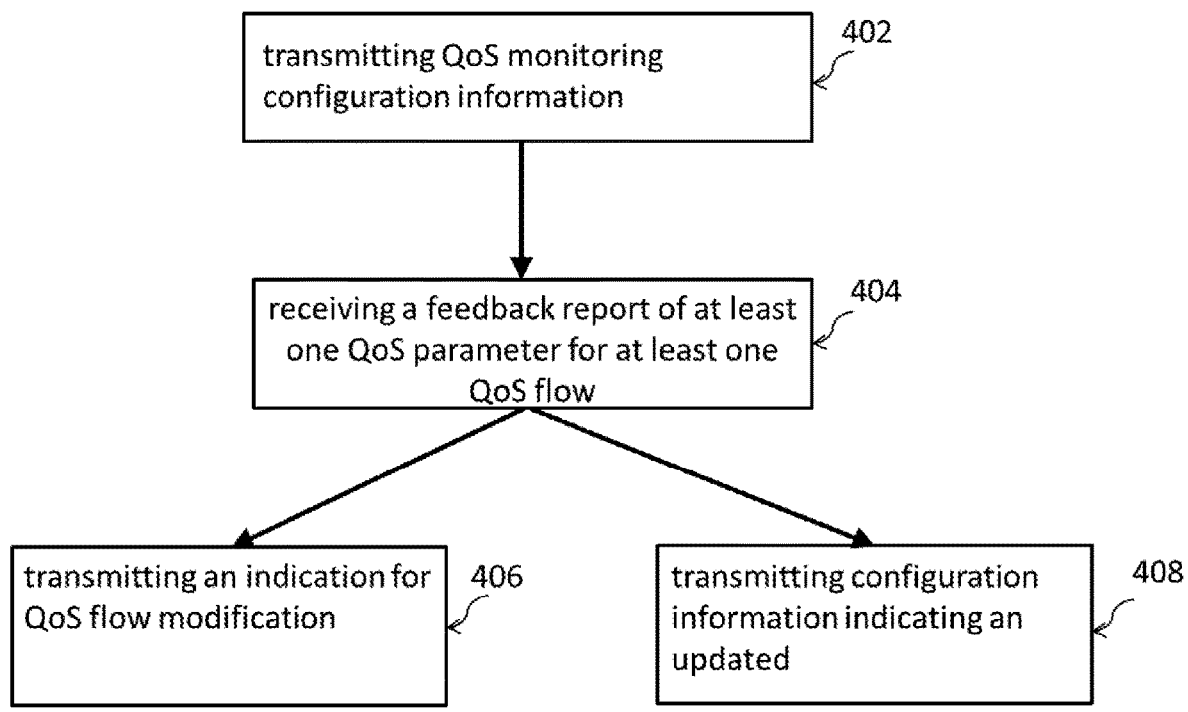
FIG. 4 is a flow chart illustrating a method for QoS monitoring and feedback in V2X communication according to another embodiment of the present application.

FIG. 4 is a flow chart illustrating a method for QoS monitoring and feedback in V2X communication according to yet another embodiment of the present application. The method may be performed by an apparatus, for example a base station 103 as illustrated in FIGS. 1A-1D.

As shown in FIG. 4, in step 402, the base station 103 may transmit QoS monitoring configuration information to at least one UE 101 within the coverage thereof, for example at least one of the Tx UE, and the Rx UE. The QoS monitoring configuration information may include at least one of QoS parameter information and QoS monitoring policy information. The QoS parameter information may include at least one of: data rate, end-to-end latency, and reliability. The reliability can be packet error rate. For a QoS flow, the corresponding QoS parameter information and QoS monitoring policy information may be configured for monitoring the QoS flow. The QoS monitoring policy information may include at least one of: threshold for each QoS parameter and the corresponding action associated with the threshold, report trigger for transmitting the feedback report, and at least one monitoring packet and a sequence number of each monitoring packet. The report trigger for transmitting the feedback report may define the time to report the monitored result of the at least one QoS parameters and may include one of the following reporting manners: one-shot trigger, periodic trigger, and event trigger.

In an embodiment the present application, the base station 103 may transmit an indication to the Rx UE to activate monitoring the QoS parameter information in the case that the Rx UE is within the coverage of the base station 103, for example, as the second UE 101b in the scenario shown in FIGS. 1A and 1D.

In step 404, the base station 103 may receive a feedback report of at least one QoS parameter for at least one QoS flow from the Tx UE or the Rx UE, for example the first UE 101a or the second UE 101b. As illustrated in the above embodiments, the Rx UE may start to monitor the QoS parameter information in other manners, for example receiving an indication from the Tx UE or as predefined. That is, the base station 103 may receive a feedback of at least one QoS parameter for at least one QoS flow even not transmitting an indication to the Rx UE to activate monitoring the QoS parameter information. The feedback report may include at least one of: identity of the second UE, session identity, QoS flow identity, and monitored result of the at least one QoS parameter.

After receiving the feedback report, the base station 103 may determine whether the QoS requirement for the at least one QoS flow cannot be met or can be increased to a level higher than the current one based on the monitored result of the at least one QoS parameter in the feedback report. For example, in the case that the base station 103 determines that the difference between the monitored at least one QoS parameter and the corresponding QoS requirement exceeds a threshold provided in the QoS monitoring policy information, the base station 103 may determine that the QoS requirement for the at least one QoS flow cannot be met or can be increased. In the case that the feedback report indicates that QoS requirement for the at least one QoS flow cannot be met or can be increased to a level higher than current one, in step 406, the base station 103 may transmit an indication to the Tx UE. The indication is for indicating the Tx UE to transmit a notification for QoS flow modification to the application layer of the Tx UE so that the Tx UE may modify the QoS flow in the application layer.

In another embodiment of the present application, in step 408, the base station 103 may transmit configuration information indicating an updated scheduling resource for the at least one QoS flow to the Tx UE, for example the first UE 101a. The Tx UE may transfer the updated scheduling resource to the Rx UE, for example the second UE 101b. Accordingly, the Tx UE and the Rx UE may use the updated scheduling resource for sidelink transmission. In yet another embodiment of the present application, the base station 103 may transmit both the indication for QoS flow modification and the configuration information indicating an updated scheduling resource to the Tx UE.

Figure 5:
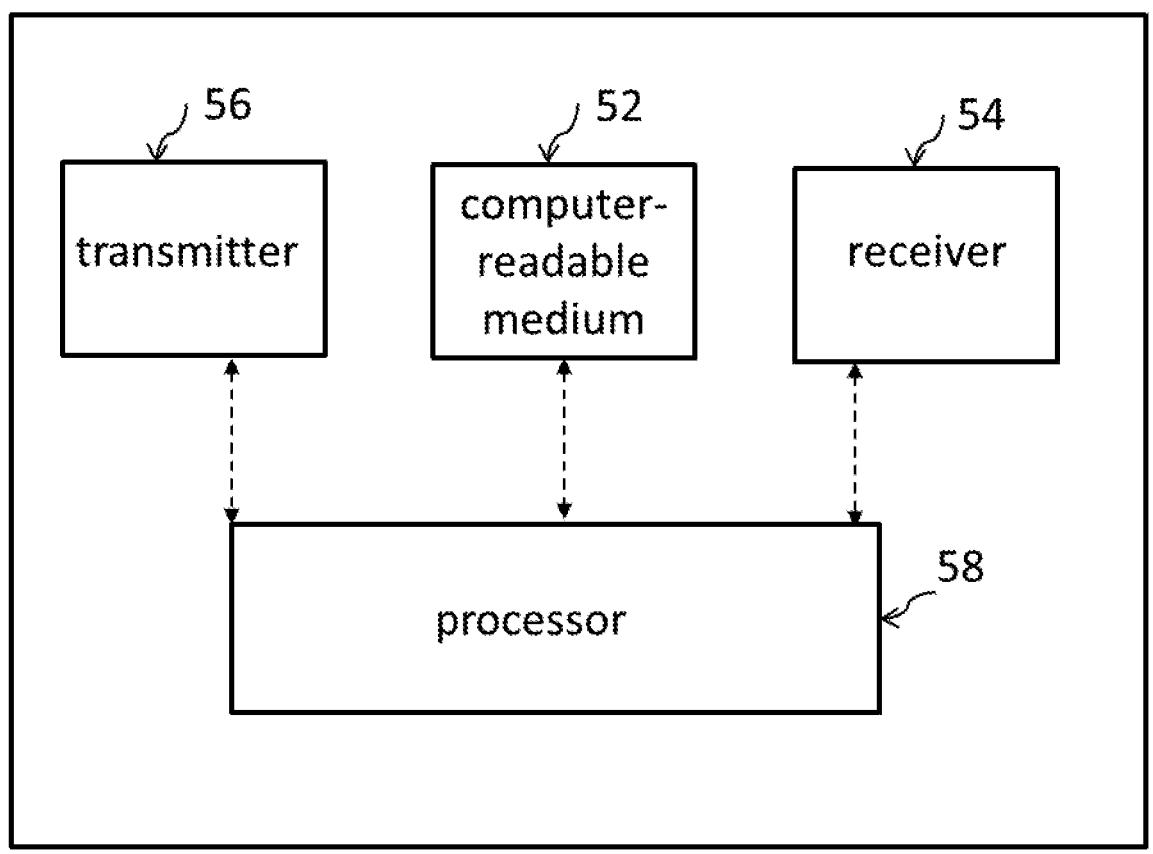
FIG. 5 illustrates a block diagram of an apparatus for QoS monitoring and feedback in V2X communication according to an embodiment of the present application.

FIG. 5 illustrates a block diagram of an apparatus 500 for QoS monitoring and feedback in V2X communication according to an embodiment of the present application, wherein the apparatus 500 may be a Rx UE a, for example the first UE 101a or second UE 101b shown in FIGS. 1A-1D.

Referring to FIG. 5, the apparatus 500 may include at least one non-transitory computer-readable medium 52, at least one receiver 54, at least one transmitter 56, and at least one processor 58. The at least one non-transitory computer-readable medium 52 may have computer executable instructions stored therein. The at least one processor 58 may be coupled to the at least one non-transitory computer-readable medium 52, the at least one receiver 54 and the at least one transmitter 56. The computer executable instructions can be programmed to implement a method with the at least one receiver 54, the at least one transmitter 56 and the at least one processor 58. The method can be a method according to an embodiment of the present application, for example, the method shown in FIG. 2.

Figure 6:
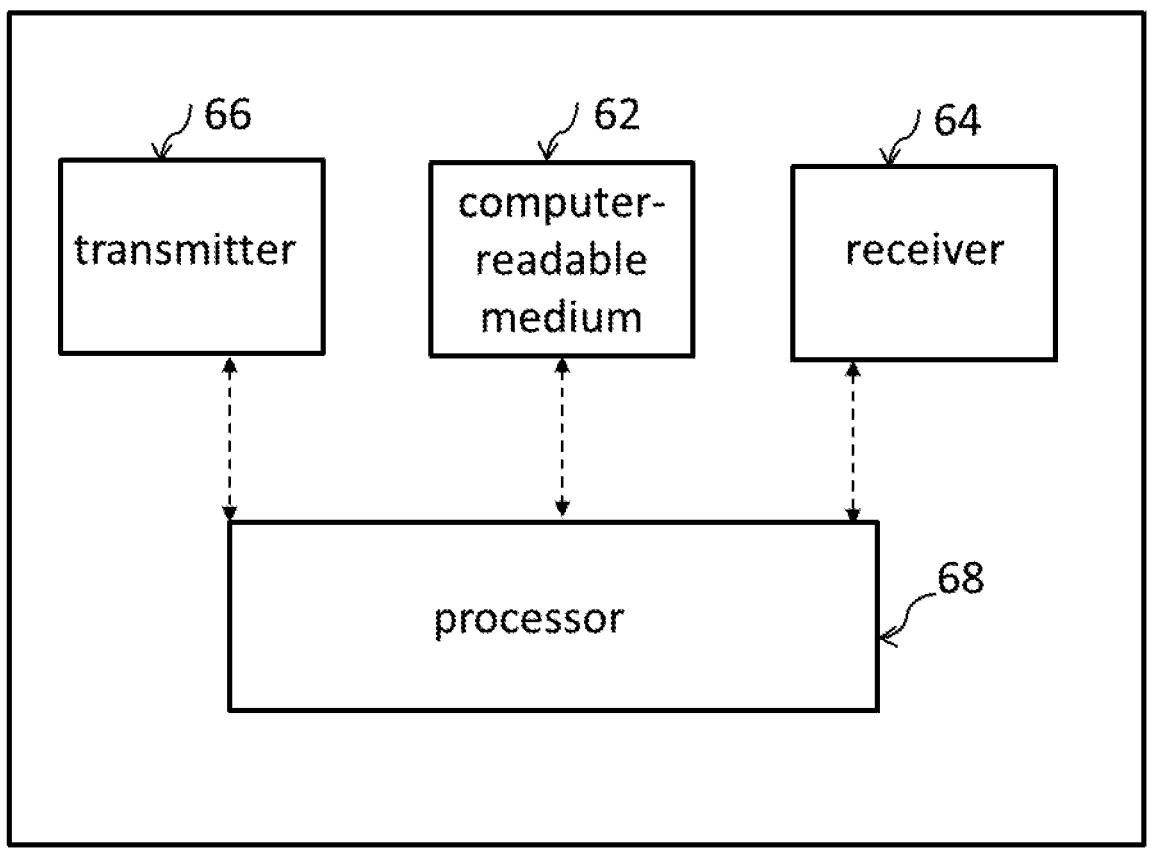
FIG. 6 illustrates a block diagram of an apparatus for QoS monitoring and feedback in V2X communication according to another embodiment of the present application.

FIG. 6 illustrates a block diagram of an apparatus 600 for QoS monitoring and feedback in V2X communication according to another embodiment of the present application, wherein the apparatus 600 may be a Tx UE, for example the first UE 101a or second UE 101b shown in FIGS. 1A-1D.

Referring to FIG. 6, the apparatus 600 may include at least one non-transitory computer-readable medium 62, at least one receiver 64, at least one transmitter 66, and at least one processor 68. The at least one non-transitory computer-readable medium 62 may have computer executable instructions stored therein. The at least one processor 68 may be coupled to the at least one non-transitory computer-readable medium 62, the at least one receiver 64 and the at least one transmitter 66. The computer executable instructions can be programmed to implement a method with the at least one receiver 62, the at least one transmitter 64 and the at least one processor 66. The method can be a method according to an embodiment of the present application, for example, the method shown in FIG. 3.

Figure 7:
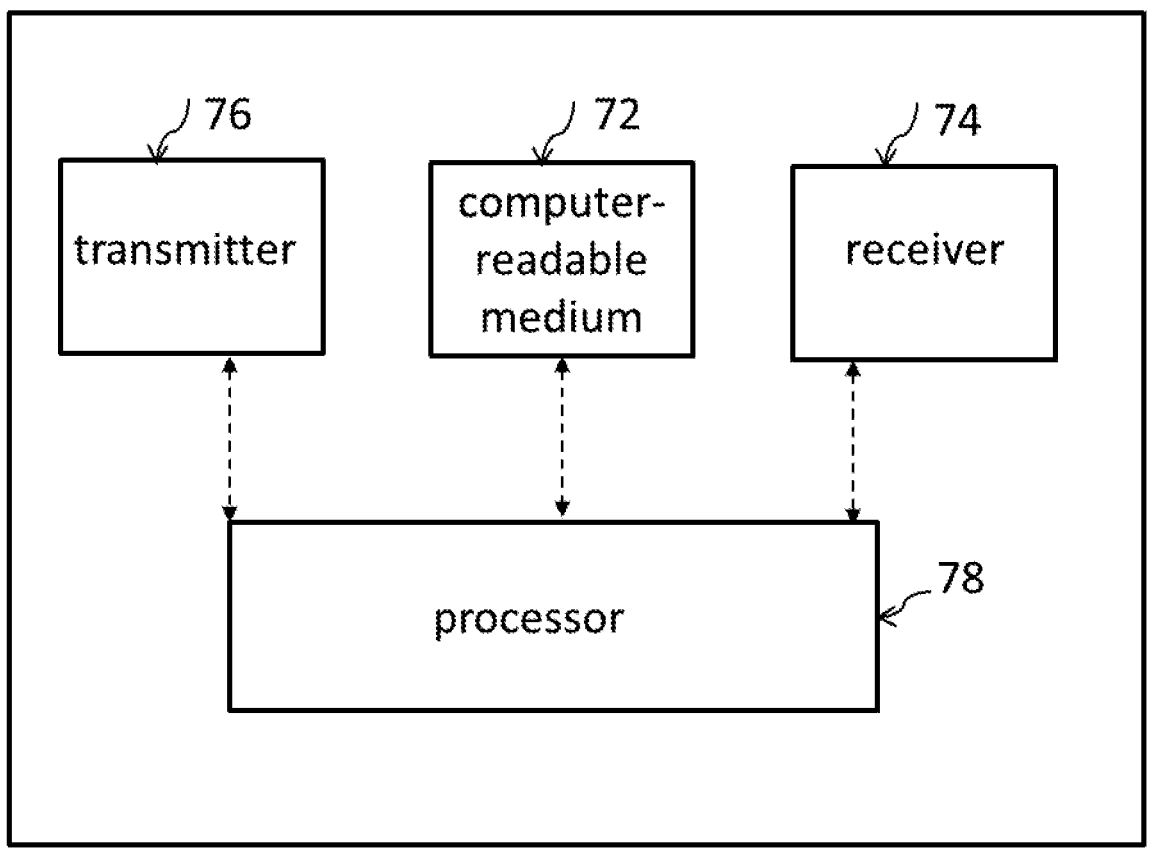
FIG. 7 illustrates a block diagram of an apparatus for QoS monitoring and feedback in V2X communication according to yet another embodiment of the present application.

FIG. 7 illustrates a block diagram of an apparatus 700 for QoS monitoring and feedback in V2X communication according to yet another embodiment of the present application, wherein the apparatus 700 may be a base station 103 shown in FIGS. 1A-1D, for example a gNB.

Referring to FIG. 7, the apparatus 700 may include at least one non-transitory computer-readable medium 72, at least one receiver 74, at least one transmitter 76, and at least one processor 78. The at least one non-transitory computer-readable medium 72 may have computer executable instructions stored therein. The at least one processor 78 may be coupled to the at least one non-transitory computer-readable medium 72, the at least one receiver 74 and the at least one transmitter 76. The computer executable instructions can be programmed to implement a method with the at least one receiver 72, the at least one transmitter 74 and the at least one processor 76. The method can be a method according to an embodiment of the present application, for example, the method shown in FIG. 4.

Figure 8:
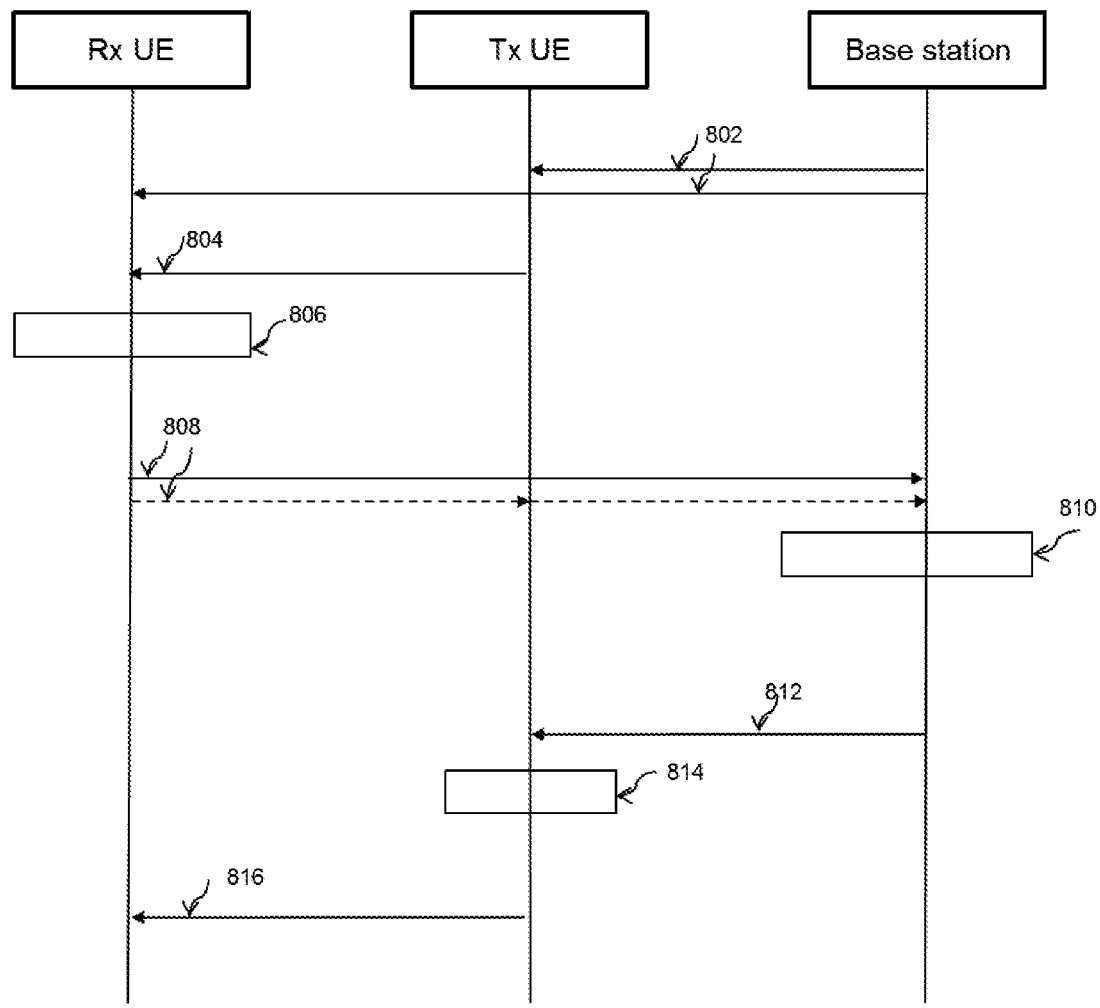
FIG. 8 is a flow chart illustrating a method for QoS monitoring and feedback in V2X communication according to yet another embodiment of the present application.

FIG. 8 is a flow chart illustrating a method for QoS monitoring and feedback in V2X communication according to yet another embodiment of the present application. The method illustrated in FIG. 8 may be used in the scenario shown in FIG. 1A, wherein the Tx UE, for example the first UE 101a, and the Rx UE, for example the second UE 101b are both within the coverage of the base station 103. In this scenario, the Tx UE may be a network schedule mode UE. That is, the resource for sidelink transmission between the Tx UE and the Rx UE is configured by the base station 103.

As shown in FIG. 8, in step 802, a base station 103, for example a gNB may transmit QoS monitoring configuration information to the Tx UE, for example the first UE 101a, and the Rx UE, for example the second UE 101b. The QoS monitoring configuration information may include at least one of QoS parameter information and QoS monitoring policy information. The QoS parameter information may include at least one of: data rate, end-to-end latency, and reliability. The reliability can be packet error rate. For a QoS flow, corresponding QoS parameter information and QoS monitoring policy information may be configured for monitoring the QoS flow. The QoS monitoring policy information may include at least one of: threshold for each QoS parameter and the corresponding action associated with the threshold, report trigger for transmitting the feedback report, and at least one monitoring packet and a sequence number of each monitoring packet. The report trigger for transmitting the feedback report may define the time to report the monitored result of the at least one QoS parameters and may include one of the following reporting manners: one-shot trigger, periodic trigger, and event trigger.

For a V2X service, the Tx UE may establish one PDU session with the Rx UE. One PDU session may include at least one DRB and each DRB may include at least one QoS flow. Each of the at least one QoS flow may have a corresponding QoS requirement. In step 804, the Tx UE, for example the first UE 101a may transmit at least one QoS flow to the Rx UE, for example the second UE 101b.

After receiving the QoS monitoring configuration information, in step 806, the Rx UE, for example the second UE 101b may begin to monitor the at least one QoS parameter of the QoS flow. The Rx UE can keep monitoring the at least one QoS parameter. In another embodiment of the present application, the Rx UE may store the received QoS monitoring configuration information, while not monitor the at least one QoS parameter until receiving an indication from the base station 103.

In step 808, the Rx UE, for example the second UE 101b may transmit a feedback report based on the monitored QoS parameter and the QoS monitoring configuration information directly to the base station 103 via Uu link in an embodiment of the present application. In another embodiment of the present application, the Rx UE may transmit a feedback report to a Tx UE, for example the first UE 101a via PC5 interface. The Tx UE may forward the feedback report to the base station 103. In yet another embodiment, the Rx UE may transmit the feedback report to both the Tx UE and the base station 103.

In the case that the report trigger indicates a periodic trigger, the Rx UE may transmit the QoS feedback report periodically based on the period configured by the base station. In the case that that the report trigger indicates an event trigger, the Rx UE may transmit the QoS feedback report after detecting that the difference between the monitored at least one QoS parameter and the corresponding QoS requirement exceeds a threshold during a time window configured by the base station. The threshold may be provided in the QoS monitoring policy information.

In step 810, the base station 103 may determine whether the QoS requirement for the at least one QoS flow cannot be met or can be increased to a level higher than the current one based on the monitored result of the at least one QoS parameter in the feedback report. The feedback report indicates that the QoS requirement for the at least one QoS flow cannot be met or can be increased to a level higher than current one. In this case, a plurality of schemes can be performed.

For example, in step 812, the base station 103 may transmit an indication to the Tx UE. The indication may indicate the Tx UE to transmit a notification for QoS flow modification to the application layer of the Tx UE, so that the Tx UE may modify the QoS flow in the application layer. In another embodiment of the present application, in step 812, the base station may transmit configuration information indicating an updated scheduling resource for the at least one QoS flow to the Tx UE such that the Tx UE may transmit it to the Rx UE, for example the second UE 101b, and then the Tx UE and the Rx UE may use the updated scheduling resource for the sidelink transmission. In yet another embodiment of the present application, the base station 103 may transmit the indication for QoS flow modification together with the configuration information to the Tx UE.

After receiving an indication to transmit a notification for QoS flow modification to the application layer of the Tx UE, the AS layer of the Tx UE may transmit a notification for QoS flow modification to the application layer of the Tx UE. After receiving the notification, in step 814, the application layer of the Tx UE may modify the QoS flow so that the QoS requirement can be met in a proper level. The Tx UE may transmit the new QoS flow different from the previous at least one QoS flow to the Rx UE in step 816.

In another embodiment of the present application, after receiving the configuration information indicating an updated scheduling resource for the at least one QoS flow, the Tx UE, for example the first UE 101a, may transmit it to the Rx UE, for example the second UE 101b, in step 816. Accordingly, the Tx UE and the Rx UE may use the updated scheduling resource for the sidelink transmission.

Figure 9:
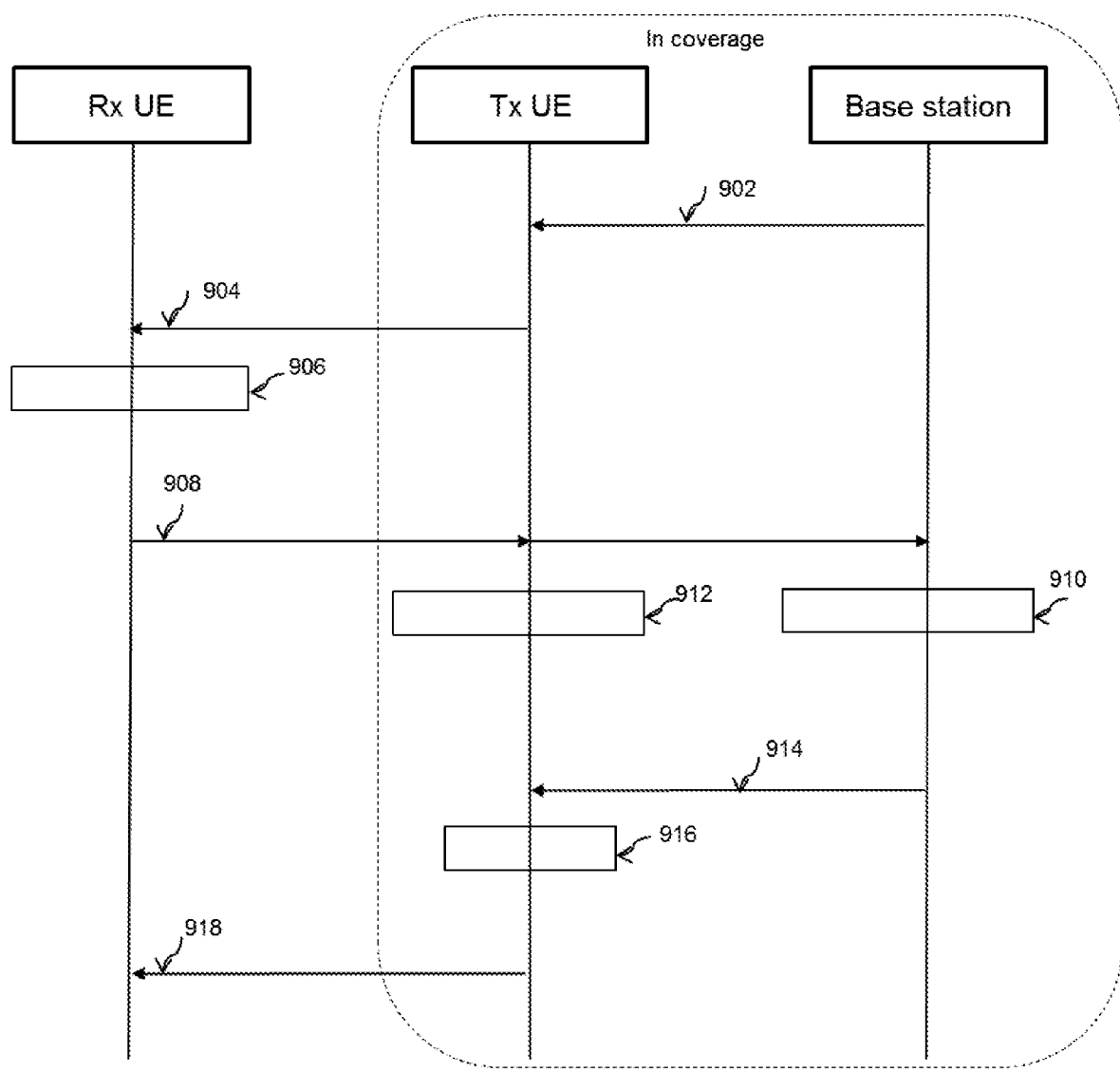
FIG. 9 is a flow chart illustrating a method for QoS monitoring and feedback in V2X communication according to yet another embodiment of the present application.

FIG. 9 is a flow chart illustrating a method for QoS monitoring and feedback in V2X communication according to yet another embodiment of the present application. The method illustrated in FIG. 9 may be used in the scenario in FIG. 1B, wherein the Tx UE, for example the first UE 101a is within the coverage of the base station, and the Rx UE, for example the second UE 101b is outside of the coverage of the base station. In this scenario, the Tx UE may be a network schedule mode UE or an autonomous resource selection mode UE.

As shown in FIG. 9, in step 902, a base station 103, for example a gNB may transmit QoS monitoring configuration information to the Tx UE, for example the first UE 101a. The QoS monitoring configuration information may include at least one of QoS parameter information and QoS monitoring policy information. In step 904, the Tx UE, for example the first UE 101a may transmit at least one QoS flow to the Rx UE, for example the second UE 101b. In step 906, the Rx UE may monitor the at least one QoS parameter of the QoS flow configured by QoS monitoring configuration information.

Since the Rx UE is outside of the coverage of the base station 103, it cannot receive the QoS monitoring configuration information from the base station 103. The Rx UE may use the QoS monitoring configuration information predefined in the Rx UE, for example in a SIM or USIM in the Rx UE to monitor the at least one QoS parameter. The predefined QoS monitoring configuration information may be the same as that in the QoS monitoring configuration information configured by the base station 103 in other embodiments of the present application. In an embodiment of the present application, the Rx UE can keep monitoring the at least one QoS parameter. In another embodiment of the present application, the Rx UE may begin to monitor the at least one QoS parameter at the time predefined in a SIM or USIM in the Rx UE. In yet another embodiment of the present application, the Rx UE may not monitor the at least one QoS parameter until receiving an indication from the Tx UE, for example the first UE 101a.

In step 908, the Rx UE, for example the second UE 101b may transmit the feedback report to the Tx UE, for example the first UE 101a via PC5 interface based on the monitored QoS parameter and the predefined QoS monitoring configuration information. The time to transmit the feedback report is based on the report trigger included in the QoS monitoring policy information. For example, in the case that the report trigger indicates a one-shot trigger, the Rx UE may transmit the QoS feedback report when receiving a QoS feedback indication for reporting the QoS feedback report from the Tx UE. In the case that the report trigger indicates a periodic trigger, the Rx UE may transmit the QoS feedback report periodically based on the period predefined in the SIM or USIM in the Rx UE. In the case that that the report trigger indicates an event trigger, the Rx UE may transmit the QoS feedback report after detecting that the difference between the monitored at least one QoS parameter and the corresponding QoS requirement exceeds the threshold in the QoS monitoring policy information during a time window. The time window may be pre-defined in the SIM or USIM in the Rx UE.

The Tx UE, for example the first UE 101a may handle the received feedback report in various manners. In an embodiment of the present application, the Tx UE is a network schedule mode UE. The Tx UE may transmit the feedback report to the base station 103. The base station 103 and Tx UE may perform the subsequent steps 910, 914, 916, and 918 same as steps 810, 812, 814, and 816 in FIG. 8, respectively. In another embodiment of the present application, the Tx UE is an autonomous resource selection mode UE. The Tx UE, for example the first UE 101a may determine whether the QoS requirement for the at least one QoS flow cannot be met or can be increased to a level higher than the current one based on the at least one QoS parameter in the feedback report in step 912. In the case that the feedback report indicates that QoS requirement for the at least one QoS flow cannot be met or can be increased to a level higher than current one, the AS layer of the Tx UE, for example the first UE 101a may transmit a notification for QoS flow modification to an application layer of the Tx UE. The same as the network schedule mode, after receiving the notification, the application layer of the Tx UE in an autonomous resource selection mode may modify the QoS flow so that the QoS requirement can be met in proper level in step 916. The Tx UE may transmit the new QoS flow different from the previous at least one QoS flow to the Rx UE in step 918.

Figure 10:
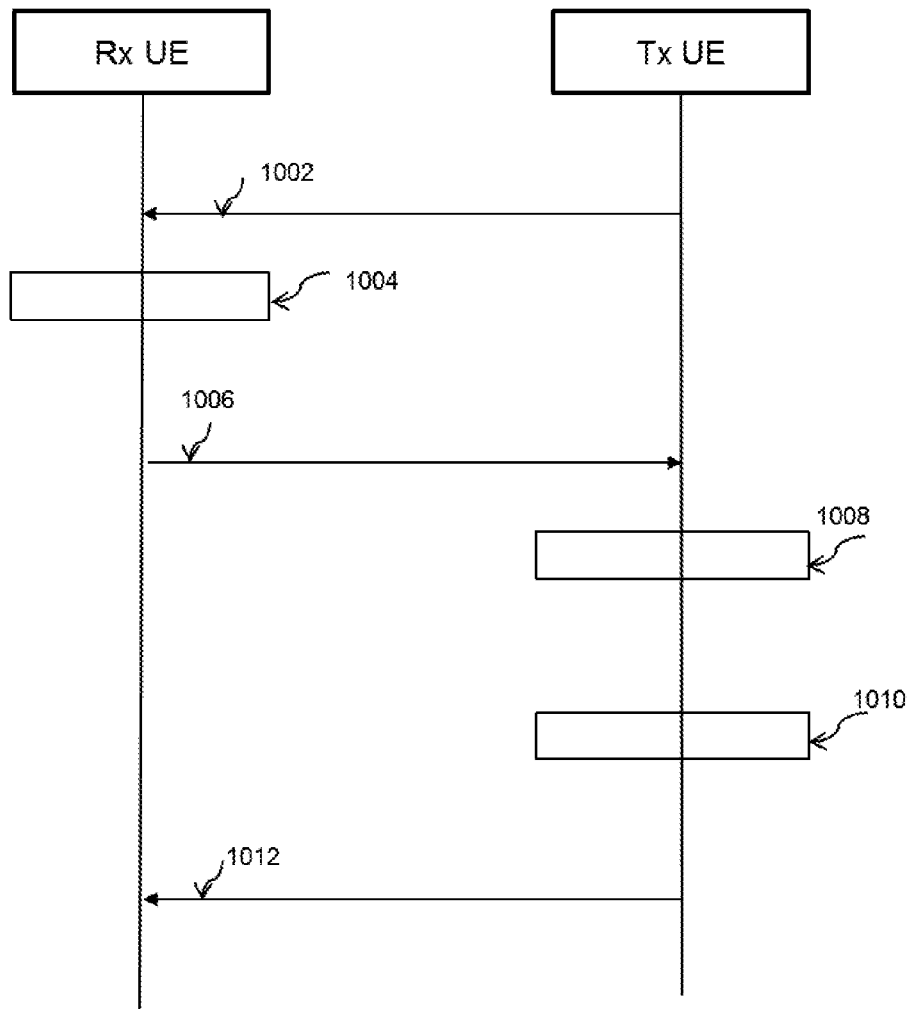
FIG. 10 is a flow chart illustrating a method for QoS monitoring and feedback in V2X communication according to yet another embodiment of the present application.

FIG. 10 is a flow chart illustrating a method for QoS monitoring and feedback in V2X communication according to yet another embodiment of the present application. The method illustrated in FIG. 10 may be used in the scenario in FIG. 1C, wherein both the Tx UE, for example the first UE 101a and the Rx UE, for example the second UE 101b are outside of the coverage of the base station. In this scenario, the Tx UE may be an autonomous resource selection mode UE.

As shown in FIG. 10, in step 1002, the Tx UE, for example the first UE 101a may transmit at least one QoS flow to the Rx UE, for example the second UE 101b. In step 1004, the Rx UE, for example the second UE 101b may monitor at least one QoS parameter of the at least one QoS flow configured by QoS monitoring configuration information.

In an embodiment of the present application, the Rx UE can keep monitoring the at least one QoS parameter provided in the QoS monitoring policy information. In another embodiment of the present application, the Rx UE may begin to monitor the at least one QoS parameter at a time predefined in the SIM or USIM in the Rx UE. In yet another embodiment of the present application, the Rx UE may not monitor the at least one QoS parameter until receiving an indication from the Tx UE, for example the first UE 101a.

In step 1006, the Rx UE, for example the second UE 101b may transmit the feedback report to the Tx UE, for example the first UE 101a via PC5 interface based on the monitored QoS parameter and the predefined QoS monitoring configuration information. In an embodiment of the present application, the report trigger may indicate a one-shot trigger, and the Rx UE may transmit the QoS feedback report when receiving a QoS feedback indication for reporting the QoS feedback report from the Tx UE. In another embodiment of the present application, the report trigger may indicate a periodic trigger, and the Rx UE may transmit the QoS feedback report periodically based on the period predefined in the SIM or USIM in the Rx UE. In yet another embodiment of the present application, the report trigger may indicate an event trigger, and the Rx UE may transmit the QoS feedback report after detecting that the difference between the monitored at least one QoS parameter and the corresponding QoS requirement exceeds the threshold in the QoS monitoring policy information during a time window. The time window may be pre-defined in the SIM or USIM in the Rx UE.

After receiving the feedback report from the Rx UE, the Tx UE, for example the first UE 101a may determine whether the QoS requirement for the at least one QoS flow cannot be met or can be increased to a level higher than the current one based on the at least one QoS parameter in the feedback report in step 1008. In the case that the feedback report indicates that QoS requirement for the at least one QoS flow cannot be met or can be increased to a level higher than current one, the AS layer of the Tx UE may transmit a notification for QoS flow modification to an application layer of the TX UE. After receiving the notification, the application layer of the Tx UE, for example the first UE 101a may modify the QoS flow so that the QoS requirement can be met in a proper level in step 1010. The Tx UE may transmit the new QoS flow different from the previous at least one QoS flow to the Rx UE, for example the second UE 101b, in step 1012.

Figure 11:
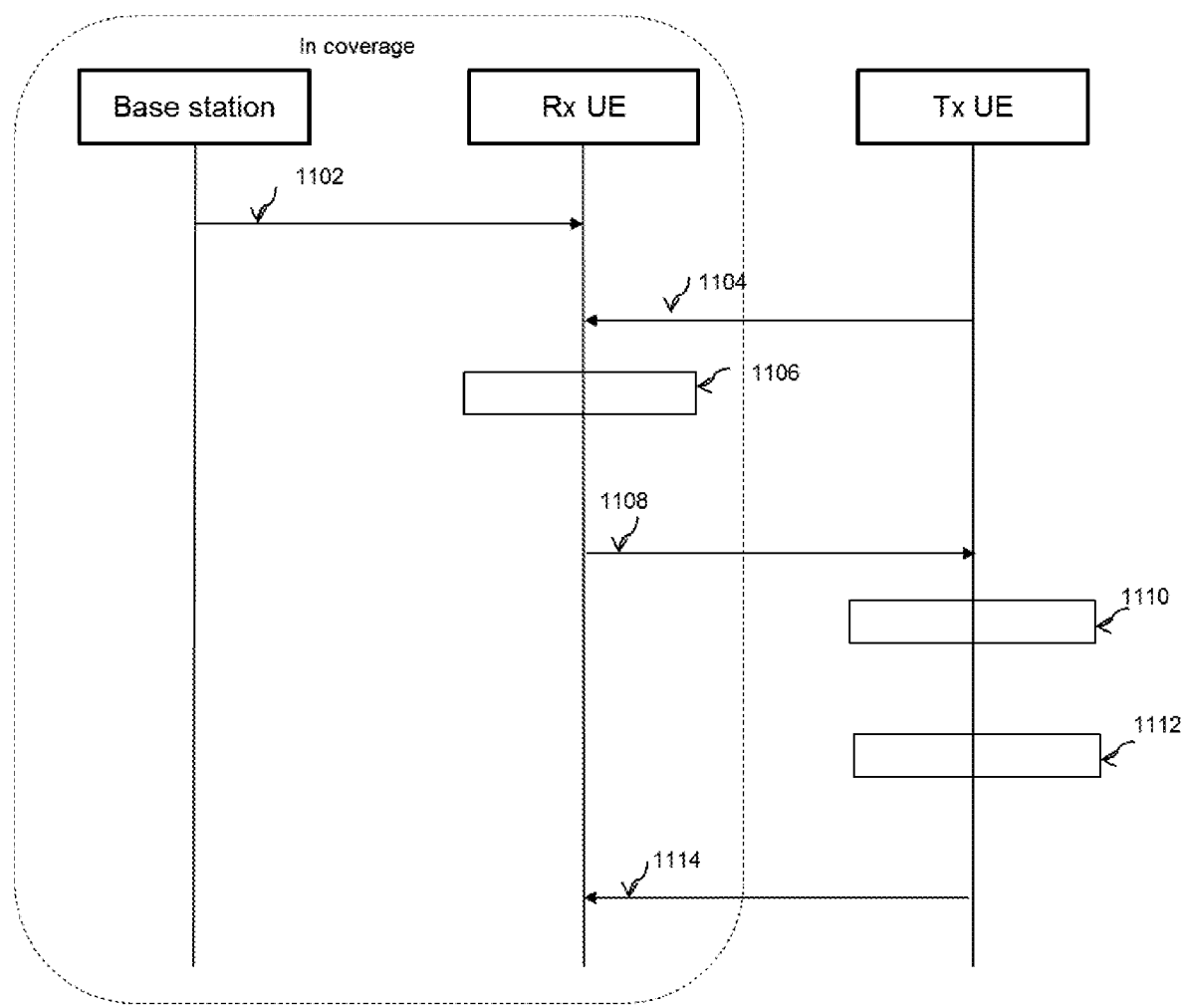
FIG. 11 is a flow chart illustrating a method for QoS monitoring and feedback in V2X communication according to yet another embodiment of the present application.

FIG. 11 is a flow chart illustrating a method for QoS monitoring and feedback in V2X communication according to yet another embodiment of the present application. The method illustrated in FIG. 11 may be used in the scenario in FIG. 1D, wherein the Rx UE, for example the second UE 101b is within the coverage of the base station 103 and the Tx UE, for example the first UE 101a is outside of the coverage of the base station. In this scenario, the Tx UE may be an autonomous resource selection mode UE.

As shown in FIG. 11, in step 1102, a base station 103, for example a gNB may transmit QoS monitoring configuration information to the Rx UE, for example the second UE 101b. The QoS monitoring configuration information may include at least one of QoS parameter information and QoS monitoring policy information. In step 1104, the Tx UE, for example the first UE 101a may transmit at least one QoS flow to the Rx UE, for example the second UE 101b.

After receiving the QoS monitoring configuration information, in step 1106, the Rx UE, for example the second UE 101b may begin to monitor the at least one QoS parameter. The Rx UE can keep monitoring the at least one QoS parameter in an embodiment of the present application. In another embodiment of the present application, the Rx UE may store the received QoS monitoring configuration information, while not monitor the at least one QoS parameter until receiving an indication from the base station 103 or a Tx UE, for example the first UE 101a.

In step 1108, the Rx UE, for example the second UE 101b may transmit the feedback report to the Tx UE, for example the first UE 101a via PC5 interface based on the monitored QoS parameter and the predefined QoS monitoring configuration information. In the case that the report trigger indicates a one-shot trigger, the Rx UE may transmit the QoS feedback report when receiving a QoS feedback indication for reporting the QoS feedback report from the Tx UE. In the case that the report trigger indicates a periodic trigger, the Rx UE may transmit the QoS feedback report periodically based on the period predefined in the SIM or USIM in the Rx UE. In the case that that the report trigger indicates an event trigger, the Rx UE may transmit the QoS feedback report after detecting that the difference between the monitored at least one QoS parameter and the corresponding QoS requirement exceeds a threshold during a time window. The time window may be pre-defined in the SIM or USIM in the Rx UE. The threshold can be provided in the QoS monitoring policy information.

After receiving the feedback report from the Rx UE, the Tx UE, for example the first UE 101a may determine whether the QoS requirement for the at least one QoS flow cannot be met or can be increased to a level higher than the current one based on the at least one QoS parameter in the feedback report in step 1110. In the case that the feedback report indicates that QoS requirement for the at least one QoS flow cannot be met or can be increased to a level higher than current one, the AS layer of the Tx UE may transmit a notification for QoS flow modification to an application layer of the TX UE. After receiving the notification, the application layer of the Tx UE, for example the first UE 101a may modify the QoS flow so that the QoS requirement can be met in a proper level in step 1112. The Tx UE may transmit the new QoS flow different from the previous at least one QoS flow to the Rx UE, for example the second UE 101b, in step 1114.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A method performed by a first user equipment (UE), the method comprising:
   transmitting at least one quality of service (QOS) flow to a second UE;
   receiving, from the second UE, a feedback report of at least one QoS parameter for the at least one QoS flow, wherein the feedback report comprises:
   an identity of the second UE;
   a QoS flow identity for the QoS flow; and
   a monitored result of the at least one QoS parameter;
   transmitting the feedback report to a base station; and
   receiving, from the base station, an indication to transmit a notification for QoS flow modification to an application layer of the first UE.

2. The method of claim 1, further comprising receiving a notification for QoS flow modification, in the application layer of the first UE, if the feedback report indicates that a QoS requirement for the at least one QoS flow cannot be met or can be increased to a level higher than a current one.

3. The method of claim 1, wherein the at least one QoS parameter comprises at least one of:
   a data rate;
   an end-to-end latency; and
   a reliability.

4. The method of claim 1, further comprising transmitting an indication to activate monitoring of the at least one QOS parameter at the second UE.

5. The method of claim 1, wherein the feedback report comprises a session identity.

6. A first user equipment (UE), comprising:
   at least one memory; and
   at least one processor coupled with the at least one memory and configured to cause the first UE to:
   transmit at least one quality of service (QOS) flow to a second UE;
   receive, from the second UE, a feedback report of at least one QoS parameter for the at least one QoS flow, wherein the feedback report comprises:
   an identity of the second UE;
   a QoS flow identity for the QoS flow; and
   a monitored result of the at least one QoS parameter;
   transmit the feedback report to a base station; and
   receive, from the base station, an indication to transmit a notification for QoS flow modification to an application layer of the first UE.

7. The first UE of claim 6, wherein the at least one processor is configured to cause the first UE to receive a notification for QoS flow modification, in the application layer of the first UE, if the feedback report indicates that a QoS requirement for the at least one QoS flow cannot be met or can be increased to a level higher than a current one.

8. The first UE of claim 6, wherein the at least one QoS parameter comprises at least one of:
   a data rate;
   an end-to-end latency; and
   a reliability.

9. The first UE of claim 6, wherein the at least one processor is configured to cause the first UE to transmit an indication to activate monitoring of the at least one QoS parameter at the second UE.

10. The first UE of claim 6, wherein the feedback report comprises a session identity.

11. A second user equipment (UE), comprising:
    at least one memory; and
    at least one processor coupled with the at least one memory and configured to cause the second UE to:
    receive, from a first UE, at least one quality of service (QOS) flow;
    transmit a feedback report of at least one QoS parameter for the at least one QoS flow, wherein the feedback report:
    comprises:
    an identity of the second UE;
    a QoS flow identity for the QoS flow; and
    a monitored result of the at least one QoS parameter; and indicates for the first UE to transmit a notification for QoS flow modification to an application layer of the first UE, if the feedback report indicates that a QoS requirement for the at least one QoS flow cannot be met or can be increased to a level higher than a current one.

12. The second UE of claim 11, wherein the at least one QoS parameter comprises at least one of:
a data rate;
an end-to-end latency; and
a reliability.

13. The second UE of claim 11, wherein the at least one processor is configured to cause the second UE to receive an indication to activate monitoring of the at least one QoS parameter at the second UE.

14. The second UE of claim 11, wherein the feedback report comprises
a session identity.

15. A processor for wireless communication, comprising:
at least one controller coupled with at least one memory and configured to cause the processor to:
transmit at least one quality of service (QOS) flow to a second user equipment (UE);
receive, from the second UE, a feedback report of at least one QoS parameter for the at least one QoS flow, wherein the feedback report comprises:
an identity of the second UE;
a QoS flow identity for the QoS flow; and
a monitored result of the at least one QoS parameter;
transmit the feedback report to a base station; and
receive, from the base station, an indication to transmit a notification for QoS flow modification to an application layer of a first UE.

16. The processor of claim 15, wherein the at least one controller is further configured to cause the processor to receive a notification for QOS flow modification, in the application layer of the first UE, if the feedback report indicates that a QoS requirement for the at least one QoS flow cannot be met or can be increased to a level higher than a current one.

17. The processor of claim 16, wherein the at least one QoS parameter comprises at least one of: a data rate; an end-to-end latency; and a reliability.

18. The processor of claim 16, wherein the controller is further configured to cause the processor to transmit an indication to activate monitoring of the at least one QOS parameter at the second UE.

19. The processor of claim 16, wherein the feedback report comprises a session identity.

* * * * *